(12) United States Patent
Zhou et al.

(10) Patent No.: US 9,071,308 B2
(45) Date of Patent: Jun. 30, 2015

(54) METHOD AND DEVICE FOR DETERMINING CODEBOOK GENERATION MODE

(71) Applicant: Huawei Technologies Co., Ltd., Shenzhen, Guangdong (CN)

(72) Inventors: Yongxing Zhou, Shenzhen (CN); Xiaotao Ren, Shenzhen (CN); Liang Xia, Shenzhen (CN); Jingyuan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/954,624

(22) Filed: Jul. 30, 2013

(65) Prior Publication Data
US 2013/0315329 A1 Nov. 28, 2013

Related U.S. Application Data

(63) Continuation of application No. PCT/CN2012/070762, filed on Jan. 30, 2012.

(30) Foreign Application Priority Data
Jan. 30, 2011 (CN) .......................... 2011 1 0033581

(51) Int. Cl.
H04B 7/04 (2006.01)
H04B 7/06 (2006.01)
H04L 25/03 (2006.01)

(52) U.S. Cl.
CPC ............ *H04B 7/0486* (2013.01); *H04B 7/0417* (2013.01); *H04B 7/0639* (2013.01); *H04B 7/0665* (2013.01); *H04B 7/0482* (2013.01); *H04L 25/03942* (2013.01)

(58) Field of Classification Search
USPC ................. 375/219, 259–260, 284, 316, 358; 455/24, 69; 708/520
See application file for complete search history.

(56) References Cited

U.S. PATENT DOCUMENTS 8,045,528 B2 * 10/2011 Lee et al. ....................... 370/334
2007/0049218 A1 * 3/2007 Gorokhov et al. ............ 455/102

(Continued)

FOREIGN PATENT DOCUMENTS

CN 101534268 A 9/2009
CN 101615979 A 12/2009

(Continued)

OTHER PUBLICATIONS

"Revised SID Proposal: Coordinated Multi-Point Operation for LTE," 3PGG TSG RAN#50, Agenda item #50, RP-101425, 3$^{rd}$ Generation Partnership Project, Valbonne, France (Dec. 2010).

*Primary Examiner* — Jean B Corrielus
(74) *Attorney, Agent, or Firm* — Leydig, Voit & Mayer, Ltd.

(57) ABSTRACT

A method for determining codebook generation mode is disclosed by the present disclosure, comprising: A: grouping M kinds of ranks among N kinds of ranks supported by a user equipment (UE) into Z sets of rank, and for each set, respectively selecting a codebook generation mode from at least two preset codebook generation modes, where N, M and Z are integers greater than or equal to 1, M is less than or equal to N, and Z is less than or equal to M; B: informing the UE or a serving cell thereof of the selection. The present disclosure also discloses a UE and a base station. The system performance can be improved by adopting the method and devices of the present disclosure.

10 Claims, 3 Drawing Sheets

(56) References Cited

U.S. PATENT DOCUMENTS

| | | |
|---|---|---|
| 2007/0097856 A1 | 5/2007 | Wang et al. |
| 2008/0298482 A1* | 12/2008 | Rensburg et al. ............. 375/260 |
| 2010/0189079 A1 | 7/2010 | Eichinger et al. |
| 2010/0189191 A1* | 7/2010 | Taoka et al. ................... 375/295 |
| 2012/0027125 A1* | 2/2012 | Zhou ............................. 375/297 |
| 2013/0294538 A1 | 11/2013 | Zhou et al. |

FOREIGN PATENT DOCUMENTS

| | | |
|---|---|---|
| CN | 101826943 A | 9/2010 |
| CN | 101931507 A | 12/2010 |
| WO | WO 2010117221 A2 | 10/2010 |

* cited by examiner

```
    ┌─────────────────────────────────────────────┐
    │ selecting a codebook generation mode for a  │ ─── 11
    │ set of rank of a user equipment from at     │
    │ least two preset codebook generation modes  │
    └─────────────────────────────────────────────┘
                          │
                          ▼
    ┌─────────────────────────────────────────────┐
    │ informing the UE or a serving cell of the   │ ─── 12
    │ selection                                   │
    └─────────────────────────────────────────────┘
```

FIG. 1

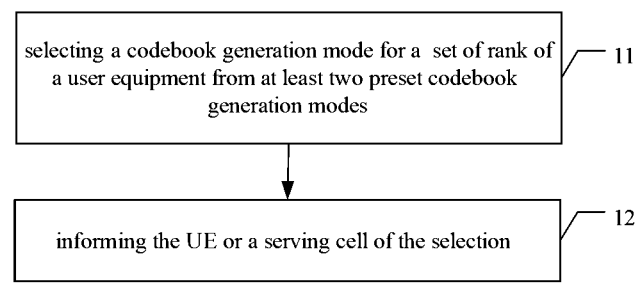

FIG. 2

METHOD AND DEVICE FOR DETERMINING CODEBOOK GENERATION MODE

CROSS-REFERENCE TO RELATED APPLICATIONS

This application is a continuation of International Patent Application No. PCT/CN2012/070762, filed on Jan. 30, 2012, which claims priority to Chinese Patent Application No. 201110033581.5, filed on Jan. 30, 2011, both of which are hereby incorporated by reference in their entireties.

TECHNICAL FIELD

The present disclosure relates to mobile communication technologies, and more particularly, to method and device for determining codebook generation mode.

BACKGROUND

In data transmission mode of coordinated multiple points transmission and reception joint process (CoMP JP), multiple cells serve a user equipment (UE) simultaneously, that is, multiple cells send same data to the UE on same time and frequency resources simultaneously. These cells which serve the UE simultaneously compose a coordination cell set, in which a cell is a serving cell, other is a coordination cell.

For example, there are 3 cells which serve a UE simultaneously, and these 3 cells are cell a, cell b and cell c respectively, and the numbers of corresponding antenna ports of the cells are Na, Nb and Nc respectively. In that way, the number of antenna ports serving the UE is Nt, that is: Nt=Na+Nb+Nc. Where specific value of Na, Nb and Nc may be the same or not, for example, Na=4, Nb=4, Nc=4, or Na=4, Nb=2, Nc=2.

In practice, both of a UE and a serving cell need to know the number of a antenna port that serve the UE and a codebook corresponding to a various available rank, for example, rank=1, rank=2, rank=3 and so on, or the number of a_various available layer where the rank or the number of the layers corresponds to the number of the antenna ports. The codebook mentioned herein can support one or more ranks. An available precoding vector or matrix, and the index number corresponding to the precoding vector or matrix, for example PMI and so on, are defined for each supported rank. Afterwards, the UE selects a suitable rank for the use of the UE according to a condition of a channel and a codebook corresponding to a various available rank, and selects a precoding matrix indicator (PMI) from a codebook corresponding to the selected rank, and feeds back the selected rank and the PMI to the serving cell. Then, the serving cell can perform scheduling process according to the received rank and PMI.

In the current technologies, when the number of a antenna port is 1, 2, 4 or 8, a corresponding codebook is definite for a various available rank. In order to facilitate the presentation, when the number of the antenna port is 1, a corresponding codebook can be called as one-antenna codebook; and when the number of the antenna port is 2, a corresponding codebook can be called as two-antenna codebook, and the like.

If the number of the antenna port that serves the UE is not 1, 2, 4 or 8, for example 6, a following codebook generation mode, namely a mode of codebook combination, can be adopted. For example, for any kind of rank, it is to combine any element of a four-antenna codebook corresponding to the rank with any element of a two-antenna codebook corresponding to the rank, which is 4+2 codebook generation mode; or, it is to combine three elements which are arbitrarily selected from the two-antenna codebook corresponding to the rank, which is 2+2+2 codebook generation mode; the other possible modes will not be mentioned one by one repeatedly herein.

In addition, a codebook generated according to different modes will be different, for example, as to any kind of rank, the codebook generated by using the 4+2 codebook generation mode is different from that generated by using the 2+2+2 codebook generation mode.

In the current technologies, a UE with the same number of an antenna port is set to use a same codebook generation mode for any rank. For example, for any rank, different UEs which are served by six antenna ports, need to use the 4+2 codebook generation mode. However, due to different actual situations, for example, conditions of channels are different, when using a certain rank, one UE may be suitable to use 4+2 codebook generation mode, while another UE may be suitable to use 2+2+2 codebook generation mode. Besides, a UE may be suitable to use 4+2 codebook generation mode when using a rank, but may be suitable to use 2+2+2 codebook generation mode when using another rank. If a used codebook generation mode is not suitable, a following used codebook will not be suitable, which will affect the accuracy of PMI obtained by the UE and the scheduling process performed by the serving cell to the UE, and will reduce the system performance.

SUMMARY

In view of this, a main object of the present disclosure is to provide a method for determining codebook generation mode, which can improve the system performance.

Another object of the present disclosure is to provide a user equipment and a base station, which can improve the system performance.

In order to achieve the above objects, the technical solutions of the present disclosure may be realized as follows.

A method for determining codebook generation mode, comprising:

selecting a codebook generation mode for a set of rank of a user equipment from at least two preset codebook generation modes, wherein the set of rank of the UE can be any one set of Z sets of the rank, and the Z sets of rank are grouped from M kinds of ranks among N kinds of ranks supported by the UE, where N, M, Z are integers greater than or equal to 1, M is less than or equal to N, and Z is less than or equal to M;

sending the selected codebook generation mode to the UE or a serving cell thereof.

A user equipment UE, comprising:

a first storing unit, configured to store at least two preset codebook generation modes;

a first processing unit, configured to select a codebook generation mode for a set of rank of a user equipment from the at least two preset codebook generation modes stored in the first storing unit, wherein the set of rank of the UE can be any one set of Z sets of rank, and the Z sets of rank are grouped from M kinds of ranks among N kinds of ranks supported by the UE, where N, M, Z are integers greater than or equal to 1, M is less than or equal to N, and Z is less than or equal to M;

a first sending unit, configured to send the selected codebook generation mode to a serving cell.

A base station, comprising:

a second storing unit, configured to store at least two preset codebook generation modes;

a third processing unit, configure to select a codebook generation mode for a set of rank of a user equipment from the at least two preset codebook generation modes stored in the second storing unit, wherein the set of rank of the UE can be any one set of Z sets of rank, and the Z sets of rank are grouped from M kinds of ranks among N kinds of ranks supported by the UE, where N, M, Z are integers greater than or equal to 1, M is less than or equal to N, and Z is less than or equal to M;

a second sending unit, configured to inform the codebook generation mode selected by the third processing unit to the UE.

It can be seen that, by adopting the technical solutions of the present disclosure, the UE can use the codebook generation mode which is suitable for itself, rather than the unified set codebook generation mode as used in the prior art, therefore the system performance is improved.

BRIEF DESCRIPTION OF THE DRAWINGS

FIG. 1 is a flowchart of a method according to an embodiment of the present disclosure;

FIG. 2 is a schematic drawing of a 4+2 mode in a method according to an embodiment of the present disclosure;

DESCRIPTION OF EMBODIMENTS

Figures 3, 4:
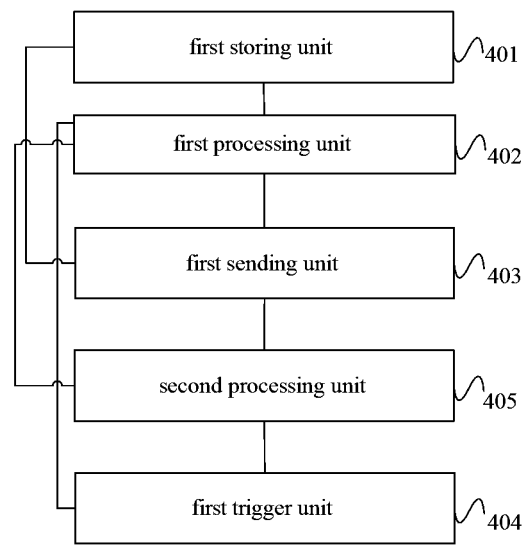
FIG. 3 is a schematic drawing of a 8–2 mode in a method according to an embodiment of the present disclosure.
FIG. 4 is a constitution structural schematic diagram of a UE according to an embodiment of the present disclosure.

To solve a problem existing in the current technologies, the present disclosure provides an improved solution for determining codebook generation mode.

In order to clarify the technical solutions of the present disclosure more clearly and obviously, the following description will make a further detailed illustration on the solutions of the present disclosure by referring to the accompanying drawings and embodiments.

FIG. 1 is a flowchart of a method according to an embodiment of the present disclosure. As shown in FIG. 1, the method includes:

Step 11: select a codebook generation mode for a set of rank of a user equipment from at least two preset codebook generation modes, where the set of rank of the UE can be any one set of Z sets of rank. The Z sets of rank are grouped from M kinds of ranks among N kinds of ranks supported by the UE, where N, M and Z are integers greater than or equal to 1, M is less than or equal to N, and Z is less than or equal to M.

In practice, a UE and a serving cell may preset and store at least two codebook generation modes, and the number of the stored codebook generation modes can be determined according to an actual demand, for example, the number of the stored codebook generation modes is 2, 3 or 4 and so on.

In this step, when Z is equal to 1, that is, when M kinds of ranks belong to a same set, a uniform codebook generation mode can be selected from the at least two preset codebook generation modes.

When Z is greater than 1 and less than M, a codebook generation mode is respectively selected from the at least two preset codebook generation modes for each set.

When Z is equal to M, that is, each kind of rank belongs to a set respectively, a codebook generation mode is respectively selected from the at least two preset codebook generation modes for each rank.

Specific values of M and Z can be determined according to a actual condition, for example, a condition of a channel, and whether there is any codebook which is obtained according to various codebook generation modes and can satisfy unitary matrix and interlayer orthogonal property.

Where, when a UE or a serving cell performs a selection, the following principles can be taken into account: when Z is equal to M, it is to select a codebook generation mode which has maximum correlation with an instantaneous channel corresponding to the UE or a long-term statistical channel corresponding to the UE, or to select a codebook generation mode which is able to maximize the performance of the UE or the system performance; when Z is less than M, it is to select a codebook generation mode which is able to maximize the performance of the UE or the system performance according to the instantaneous channel corresponding to the UE or the feature of the long-term statistical channel corresponding to the UE. A specific implementation of selecting codebook generation mode which is able to maximize the performance of the UE or the system performance is the common knowledge of the art.

The above codebook generation modes may comprise: codebook shortening and codebook combination for a codebook corresponding to a rank.

Where, the codebook shortening is to process a codebook. The codebook shortening is to remove a part related to one or several antennas in any element of a codebook; or it is to remove one several rows of any element of a codebook; or it is to remove a part related to one or several layers or streams any element of a codebook; or it is to remove one or several columns of any element of a codebook.

The codebook combination is to process two or more codebooks. By taking two codebooks as an example, it is to add one or several rows to any element of a codebook, wherein the new added one or several rows belong to any element of the other codebook, that is to say, it is to add any element of the other codebook to the any element of a codebook, so that obtained elements may correspond to more antennas; or it is to add one or several columns to any element of a codebook, wherein the new added one or several columns belong to any element of the other codebook, that is to say, it is to add any element of the other codebook to any element of a codebook, so that obtained elements may correspond to more layers or streams. In case of combining more than two codebooks, an analogy can be performed with reference to the above description.

After performing the codebook combination or the codebook shortening, normalization may be performed. In addition, a repeated part of a new codebook can be reserved or removed after the new codebook is generated; besides, the new generated codebook may also participate in the subsequent codebook shortening or codebook combination.

In this step, the selection can be performed by the UE or the serving cell; subsequently, the UE or the serving cell may inform the opposite side of the selection.

Step 12: inform the UE or the serving cell of the selected codebook generation mode.

In this step, the selected codebook generation mode can be informed as follows:

inform the UE of the selected codebook generation mode when the selection is performed by the serving cell and the Z is equal to 1;

inform the UE of the selected codebook generation mode and a corresponding rank when the selection is performed by the serving cell and the Z is greater than 1;

inform the serving cell of the selected codebook generation mode when the selection is performed by the UE and the Z is equal to 1;

inform the serving cell of the selected codebook generation mode and a corresponding rank when the selection is performed by the UE and the Z is greater than 1, or informing the serving cell of a rank which is determined, by the UE, to use and a corresponding codebook generation mode.

In addition, a predefined codebook generation mode can be used for (N minus M) kinds of ranks other than the above M kinds of ranks, for example, a fixed codebook generation mode is used. Or a codebook generation mode used by the (N minus M) kinds of ranks is informed by the UE or the serving cell, in the form of implicit mapping, to the opposite side, for example, when rank=2, a fixed codebook generation mode which satisfies a essential condition is determined from the at least two predetermined and stored codebook generation modes, the essential condition may refer to the satisfaction of unitary matrix and interlayer orthogonal property.

In practice, when saving the codebook generation modes, the UE and the serving cell may further save a index number corresponding to each codebook generation mode. In this way, the UE and the serving cell just need to inform the opposite side of a index number corresponding to a selected codebook generation mode when the opposite side needs to be informed of the selected codebook generation mode.

Specifically, the UE may use a radio resource control (RRC) signal or physical uplink control channel (PUCCH) to inform the serving cell of a selection, which may include a selected codebook generation mode, or may include a corresponding rank and so on. The serving cell may use broadcasting or a radio resource control (RRC) signal to inform the UE of the selection. Other possible ways of informing will not be repeated again herein.

In addition, the serving cell may return a acknowledgement (Confirm) message to the UE accordingly after the UE informed the serving cell of a selection. Similarly, the UE may return a confirm message to the serving cell accordingly after the serving cell informed the UE of a selection. Certainly, in practice, there may be some other signaling interactions between the UE and the serving cell, which have no direct relationship with the solution of the present disclosure, and thus will not be repeated again.

Take an example to illustrate:

For rank=1, and assuming that the number of the antenna ports serving the UE is 6, a preset codebook generation mode includes: 4+2 mode, that is, the codebook combination mode; 8−2 mode, that is, the codebook shortening mode. Then, a UE or a serving cell may select a codebook generation mode, and inform the opposite side of the selection. FIG. 2 is the schematic diagram of a 4+2 mode in a method according to an embodiment of the present disclosure, and FIG. 3 is the schematic diagram of a 8−2 mode in a method according to an embodiment of the present disclosure.

In addition, the UE then needs to feed back a PMI to the serving cell, where the specific feedback method might be as follows.

The UE determines a finally used codebook C according to a selected codebook generation mode and a condition of a channel, and selects a PMI according to the codebook C, and feeds back the PMI to the serving cell; or, when the UE obtains a finally used codebook D according to a codebook combination mode, selects a pre-coding matrix from the codebook D according to a condition of a channel which is used by the UE, and respectively finds each pre-coding matrix used for generating the selected pre-coding matrix from each codebook used for generating the codebook D, and feeds back a corresponding PMI of the each pre-coding matrix in the each codebook to the serving cell; or, the UE selects a PMI from a codebook D according to a condition of the channel which is used by the UE when the codebook D is obtained according to a codebook combination mode, and respectively finds each PMI corresponding to the selected PMI from each codebook used for generating the codebook D, and feeds back each found PMI to the serving cell. It is a current technology for the UE to determine the codebook C and codebook D, so will not be mentioned herein.

In addition, in practice, for the same UE, for any kind of rank, it may be appropriate to use a codebook generation mode in a certain time period, or appropriate to use another codebook generation mode in the next time period. Therefore, in the embodiment shown in FIG. 1, the above step 11 and step 12 can be executed repeatedly at every time when a trigger condition is satisfied. The satisfied trigger condition may refer to: a cooperation cell set corresponding to the UE is changed, for example, the number of a cell increases or decreases, and the number of a antennas port corresponding to one or some cells increases or decreases; or a condition of a channel which is used by the UE is changed, and a currently used codebook generation mode no longer meets the requirements, for example, the currently used codebook generation mode may not maximize the performance of UE or the system performance, or the correlation between a current codebook generation mode and a channel which is used by the UE is worse than that between another codebook generation mode and the channel which is used by the UE.

Based on the above description, FIG. 4 is a structural schematic diagram of a UE according to an embodiment of the present disclosure. As shown in FIG. 4, UE comprises:

a first storing unit 401, configured to store at least two preset codebook generation modes;

a first processing unit 402, configured to select a codebook generation mode for a set of rank of a UE from the at least two preset codebook generation modes stored in the first storing unit 401, where, the set of rank of the UE may be any one set of Z sets of rank. The Z sets of rank are grouped from M kinds of ranks among N kinds of ranks supported by the UE, where N, M, Z are integers greater than or equal to 1, M is less than or equal to N, and Z is less than or equal to M;

a first sending unit 403, configured to send the codebook generation mode selected by the first processing unit 402 to a serving cell.

Where, the first sending unit 403 may further comprise:

a first sending subunit, configured to inform the serving cell of the selected codebook generation mode when the Z is equal to 1;

a second sending subunit, configured to inform the serving cell of each selected codebook generation mode and a corresponding rank, or to inform the serving cell of a used rank determined by itself and a corresponding codebook generation mode.

The first storage unit 401 is further configured to store index numbers corresponding to the at least two preset codebook generation modes; the first sending unit 403 is further configured to inform the serving cell of a index number corresponding to the selected codebook generation mode.

The UE further comprises:

a first trigger unit 404, configured to detect a trigger condition, and trigger the first processing unit 402 to execute selection function when the trigger condition is satisfied. The trigger condition includes that a cooperation cell set corresponding to the UE is changed, or that a condition of a channel which is used by the UE is changed.

The at least two preset codebook generation modes comprise: codebook shortening and codebook combination.

The UE may further comprise:

a second processing unit 405, configured to determine a finally used codebook C according to a codebook generation mode selected by the first processing unit 402 and a condition of a channel, and to determine the pre-coding matrix indication PMI according to the codebook C; or, configured to obtain a finally used codebook D according to a codebook combination mode, to select a pre-coding matrix from the codebook D according to a condition of a channel which is used by the UE, and to respectively find each pre-coding matrix used for generating the pre-coding matrix from each codebook used for generating the codebook D, and to determine the corresponding PMI of the each pre-coding matrix in the each codebook, when the codebook combination mode selected by the first processing unit 402 is codebook combination; or, configured to obtain a codebook E according to a codebook combination mode, to select PMI from the codebook E according to a condition of a channel which is used by the UE, to respectively determine each PMI corresponding to the PMI from each codebook used for generating the codebook E, when the codebook combination mode selected by the first processing unit 402 is codebook combination. And, the first sending unit 403 is further configured to send the PMI determined by the second processing unit 405 to a serving cell.

Figure 5:
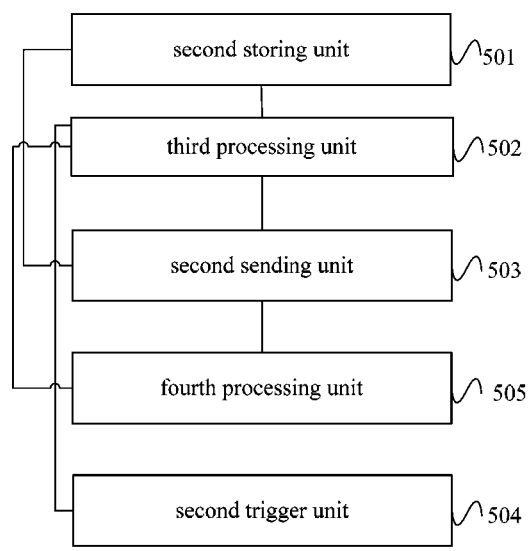
FIG. 5 is a constitution structural schematic diagram of a base station according to an embodiment of the present disclosure.

FIG. 5 is a structural schematic diagram of a base station according to an embodiment of the present disclosure. As shown in FIG. 5, the base station comprises:

a second storage unit 501, configured to store at least two preset codebook generation modes;

a third processing unit 502, configure to select a codebook generation mode for a set of rank of a UE from the at least two preset codebook generation modes stored by the second storage unit 501, where, the set of rank of the UE can be any one set of Z ets of rank. The Z sets of rank are grouped from M kinds of ranks among N kinds of ranks supported by the UE, where N, M, Z are integers greater than or equal to 1, M is less than or equal to N, and Z is less than or equal to M;

a second sending unit 503, configured to inform the codebook generation mode selected by the third processing unit 502 to the UE.

In particular, the second sending unit 503 comprises:

a third sending subunit, configured to inform the UE of the selected codebook generation mode when the Z is equal to 1;

a fourth sending subunit, configured to inform the UE of each selected codebook generation mode and a corresponding rank when Z is greater than 1.

The second storage unit 501 is further configured to store the at least two preset codebook generation modes. The second sending unit 503 is further configured to inform the UE of a index number corresponding to the selected codebook generation mode.

The base station further comprises:

a second trigger unit 504, configured to detect a trigger condition, and trigger the third processing unit 502 to execute selection function when the trigger condition is satisfied. Herein the trigger condition includes that a cooperation cell set corresponding to the UE is changed, or that a condition of a channel which is used by the UE is changed.

The at least two preset codebook generation modes comprise: codebook shortening and codebook combination.

The specific work processes of the equipments shown in FIG. 4 and FIG. 5 can refer to the corresponding description of the method according to the embodiment shown in FIG. 1, which will not be repeated again. In a word, the system performance can be improved by adopting the technical solutions of the present disclosure.

It should be noted that the above embodiments are just some preferred embodiments of the present disclosure and give no limit to the scope of the present disclosure. Any amendments, equivalent substitutions and improvements within the sprit and principle of the present disclosure, shall be included in the protective scope of the present disclosure.

What is claimed is:

1. A method for determining a codebook generation mode, comprising:

selecting, by a transmitter, a codebook generation mode for a set of rank of a user equipment (UE) from at least two preset codebook generation modes, wherein the set of rank of the UE is any one set of Z sets of rank, and the Z sets of rank are grouped from M kinds of ranks among N kinds of ranks supported by the UE, where N, M, Z are integers greater than or equal to 1, M is less than or equal to N, and Z is less than or equal to M; and sending, by the transmitter, the selected codebook generation mode to the UE or a serving cell of the UE;

wherein the sending, by the transmitter, the selected codebook generation mode comprises:

informing the UE of the selected codebook generation mode when the selection is performed by the serving cell and Z is equal to 1;

informing the UE of the selected codebook generation mode and a corresponding rank when the selection is performed by the serving cell and Z is greater than 1;

informing the serving cell of the selected codebook generation mode when the selection is performed by the UE and Z is equal to 1; and informing the serving cell of the selected codebook generation mode and a corresponding rank when the selection is performed by the UE and Z is greater than 1, or informing the serving cell of a used rank determined by the UE and a corresponding codebook generation mode when the selection is performed by the UE and Z is greater than 1.

2. The method according to claim 1, further comprising:

informing, in the form of implicit mapping, the UE or the serving cell of the codebook generation mode used by N-M kinds of ranks.

3. The method according to claim 1, wherein the selecting a codebook generation mode comprises:

when Z is equal to M, selecting a codebook generation mode that has maximum correlation with an instantaneous channel corresponding to the UE or a long-term statistical channel corresponding to the UE, or selecting a codebook generation mode that maximizes the performance of the UE or system performance; or, when Z is less than M, selecting a codebook generation mode which maximizes the performance of the UE or system performance according to the instantaneous channel corresponding to the UE or the long-term statistical channel corresponding to the UE.

4. The method according to claim 1, wherein when the at least two preset codebook generation modes have corresponding index numbers, the informing the UE or the serving cell of the selected codebook generation mode comprises: informing the UE or the serving cell of an index number corresponding to the selected codebook generation mode.

5. The method according to claim 1, wherein the step of selecting a codebook generation mode is performed when a trigger condition is satisfied.

6. The method according to claim 5, wherein satisfying the trigger condition comprises:

a cooperation cell set corresponding to the UE is changed, or a condition of a channel of the UE is changed.

7. The method according to claim 1, wherein the at least two preset codebook generation modes comprise: codebook shortening and codebook combination.

8. The method according to claim 7, further comprising:
determining, by the UE, a finally used codebook according to the selected codebook generation mode and a condition of a channel, and determining a pre-coding matrix indication (PMI) according to the finally used codebook, and feeding back the determined PMI to the serving cell.

9. The method according to claim 7, further comprising:
obtaining a finally used codebook according to a codebook combination mode, selecting a pre-coding matrix from the finally used codebook according to a condition of a channel which is used by the UE, and respectively finding each pre-coding matrix used for generating the selected pre-coding matrix from each codebook used for generating the finally used codebook, determining a corresponding pre-coding matrix indication (PMI) of the each pre-coding matrix in each codebook, and feeding back the determined PMI to the serving cell, when the selected codebook combination mode is codebook combination.

10. The method according to claim 7, further comprising:
obtaining a codebook according to a codebook combination mode, selecting pre-coding matrix indication (PMI) from the codebook according to a condition of a channel which is used by the UE, respectively determining each PMI corresponding to the PMI from each codebook used for generating the codebook, feeding back each determined PMI to the serving cell, when the selected codebook combination mode is codebook combination.

* * * * *